(12) United States Patent  (10) Patent No.: US 7,059,161 B2
Armenat et al.  (45) Date of Patent: Jun. 13, 2006

(54) THIN-STRIP COILER COMPRISING A FLATNESS MEASURING ROLL

(75) Inventors: Jürgen Armenat, Kreuztal (DE); Klaus-Jürgen Grosshardt, Netphen (DE); Martin Braun, Kreuztal (DE)

(73) Assignee: SMS Demag AG, Düsseldorf (DE)

( * ) Notice: Subject to any disclaimer, the term of this patent is extended or adjusted under 35 U.S.C. 154(b) by 43 days.

(21) Appl. No.: 10/481,998

(22) PCT Filed: Jun. 11, 2002

(86) PCT No.: PCT/EP02/06358

§ 371 (c)(1),
(2), (4) Date: Jul. 23, 2004

(87) PCT Pub. No.: WO03/004963

PCT Pub. Date: Jan. 16, 2003

(65) Prior Publication Data

US 2004/0244450 A1    Dec. 9, 2004

(30) Foreign Application Priority Data

Jun. 30, 2001    (DE) ................................ 101 31 850

(51) Int. Cl.
*B21B 37/28*    (2006.01)
(52) U.S. Cl. ............................ 72/11.7; 72/9.1; 72/148; 72/250
(58) Field of Classification Search .................. 72/9.1, 72/11.7, 146, 148, 205, 250, 251, 365.2; 73/159, 862.07; 33/533; 700/154
See application file for complete search history.

(56) References Cited

U.S. PATENT DOCUMENTS

| 4,004,459 | A | * | 1/1977 | Greenberger ............ 73/862.07 |
| 4,463,586 | A | * | 8/1984 | Griffin ........................ 72/11.7 |
| 4,972,706 | A | * | 11/1990 | Adolfsson et al. ............ 73/159 |
| 5,546,779 | A | * | 8/1996 | Ginzburg ..................... 72/11.4 |
| 6,729,757 | B1 | * | 5/2004 | Faure et al. .................. 374/50 |
| 6,782,726 | B1 | * | 8/2004 | Armenat et al. ............. 72/9.1 |

FOREIGN PATENT DOCUMENTS

| DE | 3347486 | 7/1985 |
| DE | 3721746 | 1/1989 |
| DE | 196 09 135 A | 9/1997 |
| WO | 0041823 | 7/2000 |
| WO | 0151227 | 7/2001 |

* cited by examiner

*Primary Examiner*—Ed Tolan
(74) *Attorney, Agent, or Firm*—Friedrich Kueffner

(57) ABSTRACT

The invention relates to a method and device for measuring and influencing the strip flatness in the coiler shaft of a hot-strip mill, whereby the coiler shaft has, between a driver and a coiler, moving and stationary strip guides as well as a flatness measuring roll (13). The hot strip (1) is supplied via the coiler shaft to a coiler, which is provided with a coiler mandrel (5), pressure rolls (6) and with deflecting shells (7), over a roller table (2) and the driving rolls (3, 4) of the driver. The flatness measuring roll (13) is displaced out of a working position, in which the hot strip is guided around the flatness measuring roll (13) while maintaining an approximately constant contact angle α, and into a lowered position. In addition, a strip guide (14), which can swivel inward and protects the flatness measuring roll (13), is placed inside the coiler shaft.

15 Claims, 9 Drawing Sheets

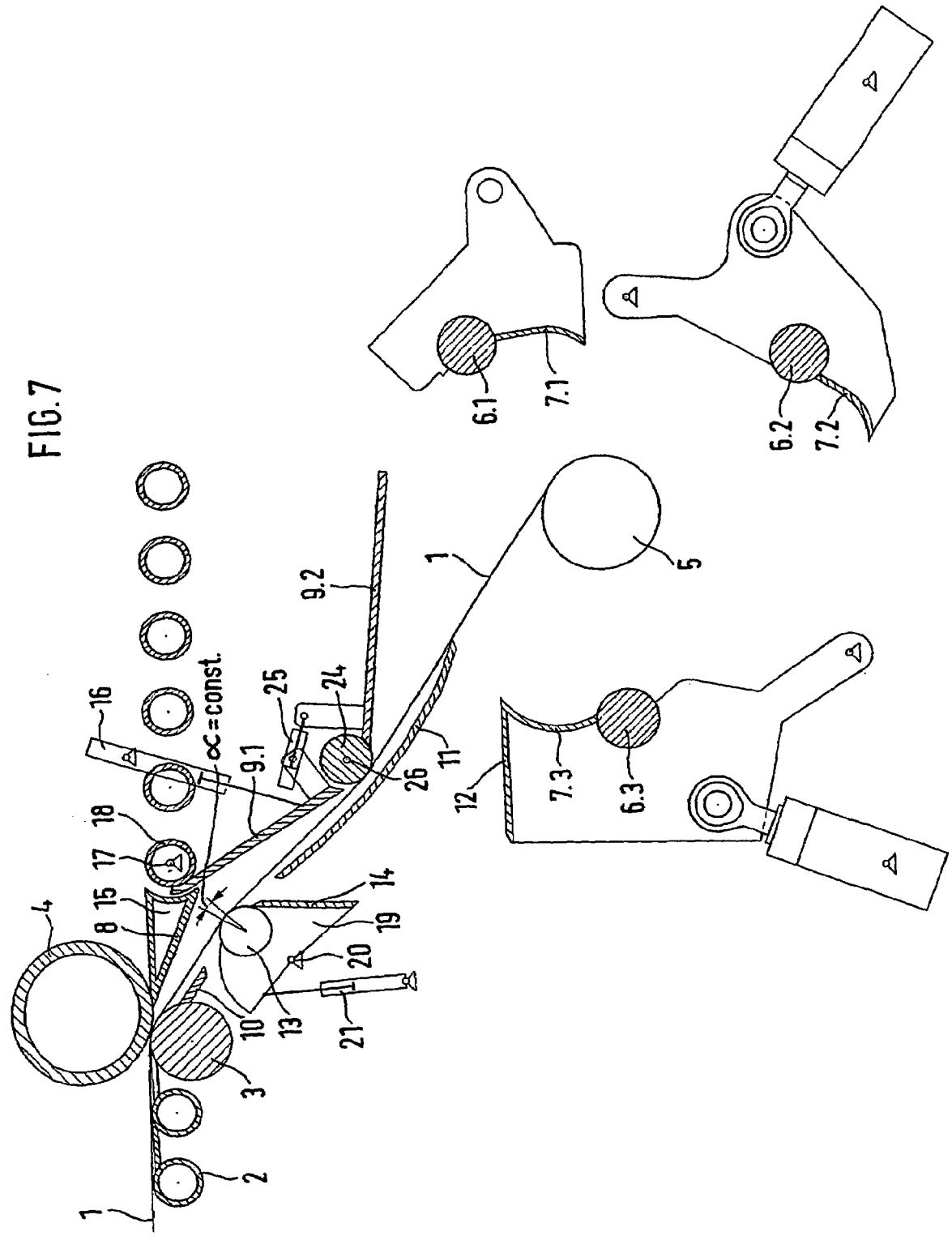

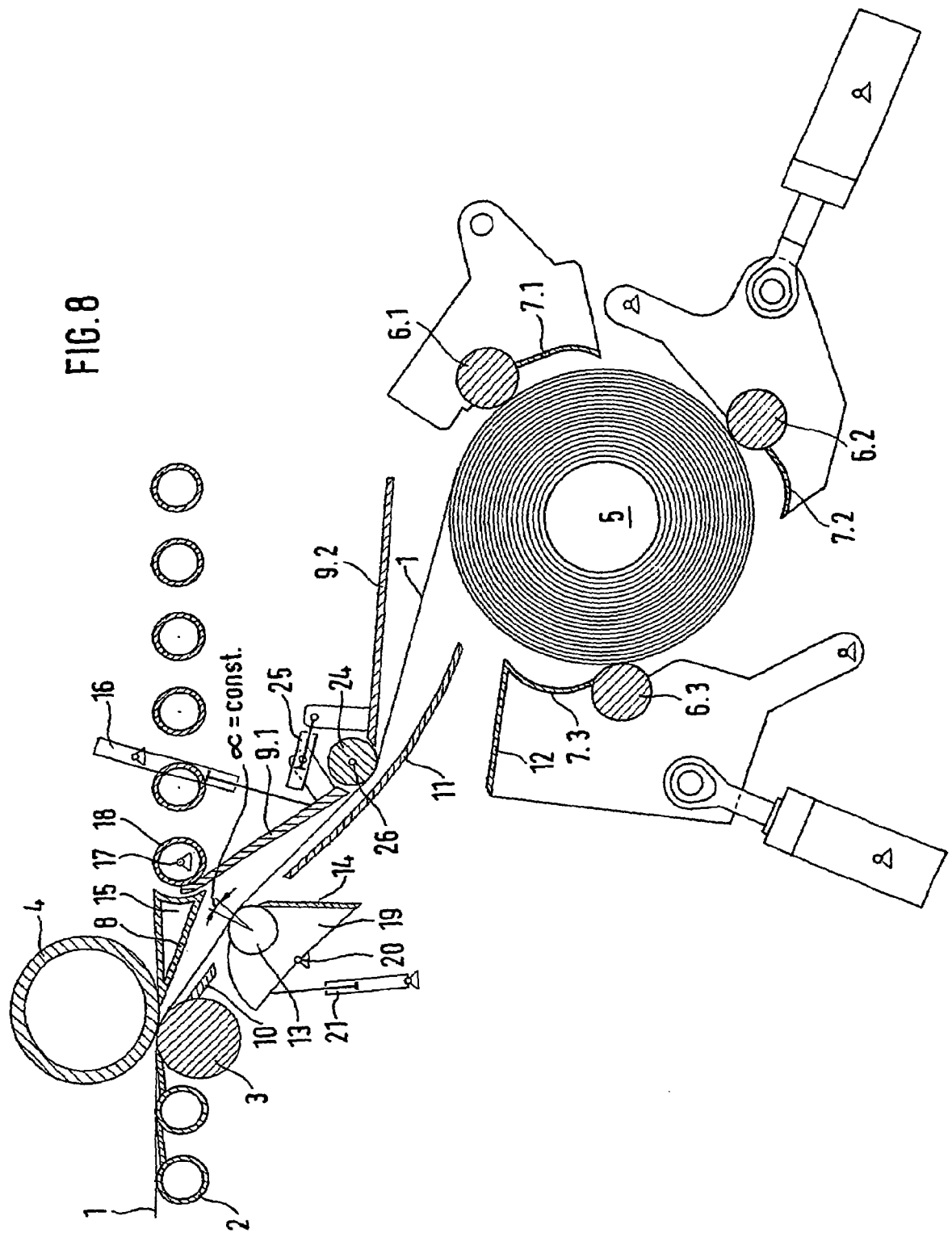

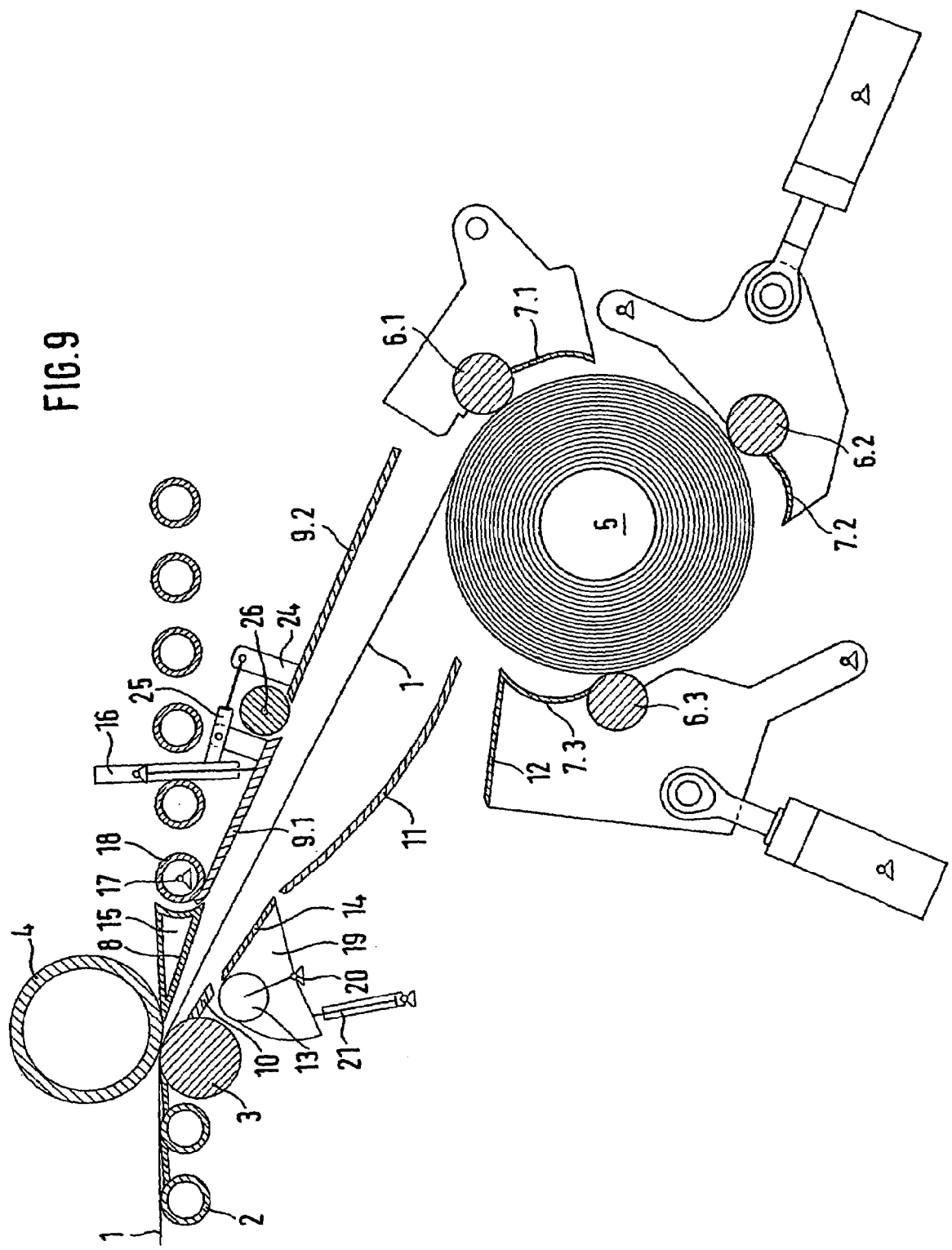

THIN-STRIP COILER COMPRISING A FLATNESS MEASURING ROLL

This application is a 35 USC 371 of PCT/EP02/06325 filed Jun. 11, 2002.

The invention pertains to a process for measuring and influencing the flatness of strip material in the coiler shaft of a hot-strip mill, where the coiler shaft has movable and stationary strip guides between a driver and a coiler and also a flatness measuring roll which is moved from a work position in which the hot strip is guided around the flatness measuring roll while maintaining an essentially constant angle $\alpha$ of contact, into a lowered position, and where the hot strip is sent by way of a roller table and the drive rolls of the driver through the coiler shaft to a coiler equipped with a coiling mandrel, pressure rolls, and deflecting shells. The invention also pertains to a device for implementing the process.

In cold-rolling mills, it is known that flatness measuring rolls can be used to control the screw-down settings and adjustments of the stands so that a rolled strip free of stresses can be obtained. For example, the rolling force of one stand can be made different from that of the next, and/or corrective measures can be carried out by means of the existing adjusting systems (e.g., bending, hydraulic screw-down, roll cooling, etc.). In modern hot-rolling processes, strips are rolled to a minimum thickness of <1.0 mm. The flatness of the strip is very important in the production of thin, hot-rolled strip and imposes strict requirements on the various components of the system. The various devices downline from the rolling stands, such as the strip cooling unit, the roller table with roll cooling, and the driver in front of the coiler also affect the flatness of the strip.

The idea of measuring flatness by means of a flatness measuring roll offers advantages when the final strip is to have a thickness of approximately 3 mm or less, because the previously used optical measuring system units eventually encounter their limits as the final thickness of the strip decreases and the runout velocities increase.

The disadvantage here, however, is that the flatness measuring roll is attached to the end of the roller table, and thus any factors which influence the flatness of the strip downstream from this point are not taken into account.

An arrangement for measuring the flatness of a rolled strip in a hot-rolling mill with a blooming train and a finishing train with several rolling stands and a coiler is known from DE 197 04 447 A1, where one or more measuring rolls are installed between, for example, the driver apparatus and the coiler. One or more measuring rolls are provided in the coiler shaft, but negative strip running properties are observed, usually at the beginning and end of the strip.

WO 00/41823 of the generic type discloses a raisable and lowerable flatness measuring roll in a coiler shaft which when it is made inoperative is replaced by roller table rollers. Protection of the flatness measuring roll against contamination and heat is not ensured in this position. Because of the complicated roller table rollers, the arrangement is very expensive.

WO 01/51227 discloses a similar flatness measuring roll which, however, is not arranged in the coiler shaft. In addition to the roller table rollers, this flatness measuring roll has an additional protective plate which makes the arrangement even more expensive.

The invention is based on the task of further developing the generic flatness measuring roll arrangement in such a way that it can be manufactured very advantageously and additionally provides an effective protection for the flatness measuring roll in the lowered position.

In a process and in a device of the type indicated above, this task is accomplished by the features of Process claim 1 and by the features of Device claim 2. Advantageous embodiments of the invention and various elaborations of the device are disclosed in the subclaims.

The basic idea of the invention is to provide a process and a device for measuring and influencing the flatness of the strip, where the flatness measuring roll is moved out of a working position, in which the hot strip is guided around the flatness measuring roll under maintenance of a more-or-less constant contact angle, into a lowered position, and in that the flatness measuring roll is protected in the coiler shaft by a strip guide, which can be swiveled into and out of position.

As a result of this measure, the flatness measuring roll can be moved into a protected position, preferably at both the beginning and at the end of the strip. A strip guide which has swiveled inward to protect the flatness measuring roll is installed in the coiler shaft, as a result of which the strip can be made to run more reliably, especially at the beginning and end of the strip. Additional details and advantages of the invention can be derived from the following description, which explains in greater detail the exemplary embodiments of the invention illustrated in the drawings:

FIG. 7 shows a flatness measuring roll according to FIG. 6 in the measuring position after the deflection roll has been lowered shortly after the start of coiling;

FIG. 8 shows a flatness measuring roll according to FIG. 6 in the measuring position after the deflection roll has been lowered and shortly before the end of the coiling process; and FIG. 9 shows a flatness measuring roll according to FIG. 6 in the lowered position and a deflection roll in the raised position during the outfeed of the end of the strip.

Figure 1:
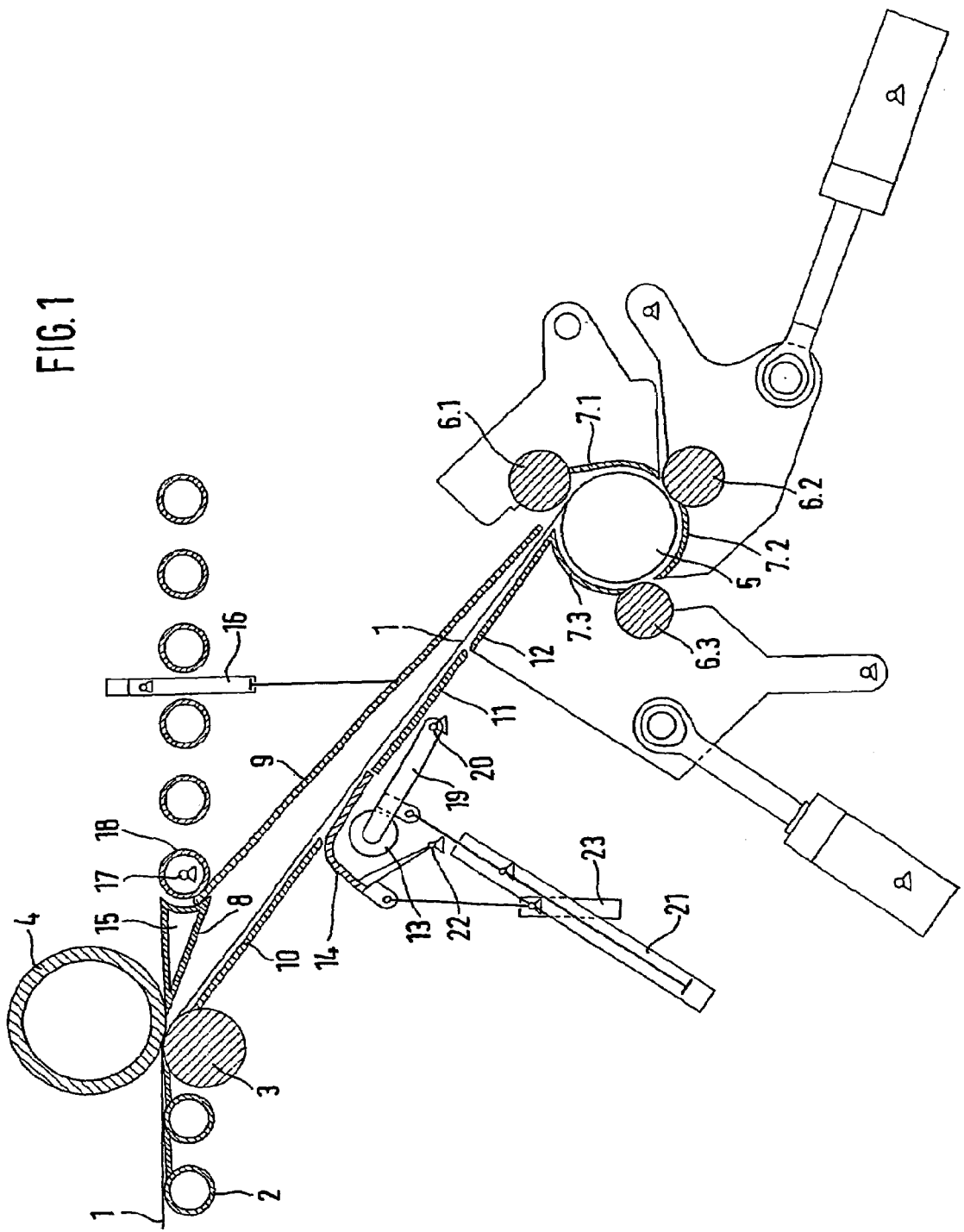
FIG. 1 shows a flatness measuring roll, installed between the driver and the coiler, during the infeed of the beginning of the strip.

A hot strip 1 is sent via a roller table 2 to the drive rolls 3 and 4 of a driver and from there to a coiler, which is equipped with a coiling mandrel 5, pressure rolls 6, and deflecting shells 7. Strip guides 8, 9, 10, 11, 12; a flatness measuring roll 13; and a swiveling protective device 14 are installed between the driver and the coiler. The strip guide 8 is a part of a strip distributing guide 15 for redirecting the beginning of the strip as desired in cases where multiple coilers are being used.

The strip guide 9 is a shaft flap 9, actuated by means of, for example, a cylinder 16; immediately after the entrance of the strip, this flap is swiveled upward around the center of rotation 17, which is shared in common by the strip distributing guide 15, the shaft flap 9, and the distributing guide roll 18.

The strip guide 10 is a stationary guide, which can be adjusted only with respect to the gap between it and the drive roll 3.

The strip guide 11 is also stationary, whereas the strip guide 12, which is connected to the deflecting shell 7.3, is swiveled away together with the shell and the pressure roll 6.3 after the strip has entered.

The flatness measuring roll 13 is supported in a swiveling frame 19, which turns around a stationary center of rotation 20 and can be swiveled by, for example, an automatically position-controlled hydraulic cylinder 21.

An actual-value position sensor, which can be mounted either in the hydraulic cylinder 21 or at the center of rotation 20, records the actual position of the swiveling frame 19, i.e., of the flatness measuring roll 13.

The swiveling protective device 14 can swivel around the stationary center of rotation 22 under the action of, for example, a cylinder 23. This protective device 14 serves both the guide the strip during the entrance of the strip and also to protect the measuring roll 13 when it is in the lowered position.

The flatness measuring roll 13 is equipped with a rotary drive (not shown), both the rotational speed and torque of which are automatically controlled, so that, when the roll is in contact with the strip, there will be no relative velocity between the strip 1 and the surface of the roll, and no scorings or material deposits will form. As a result, it is possible to begin the flatness measurement as soon as contact with the strip has been established.

Figure 2:
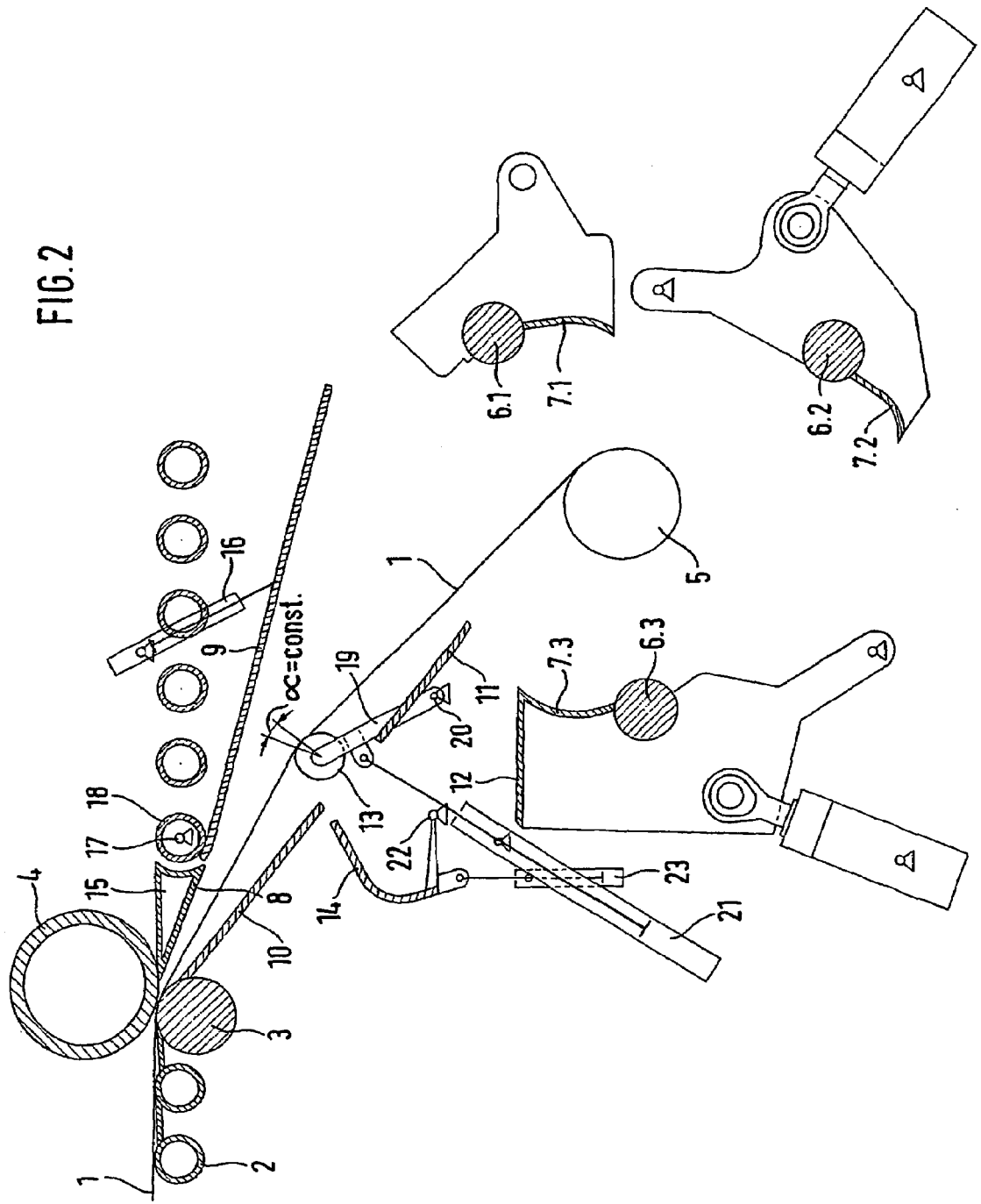
FIG. 2 shows a flatness measuring roll in the measuring position just after the start of coiling.
Figure 3:
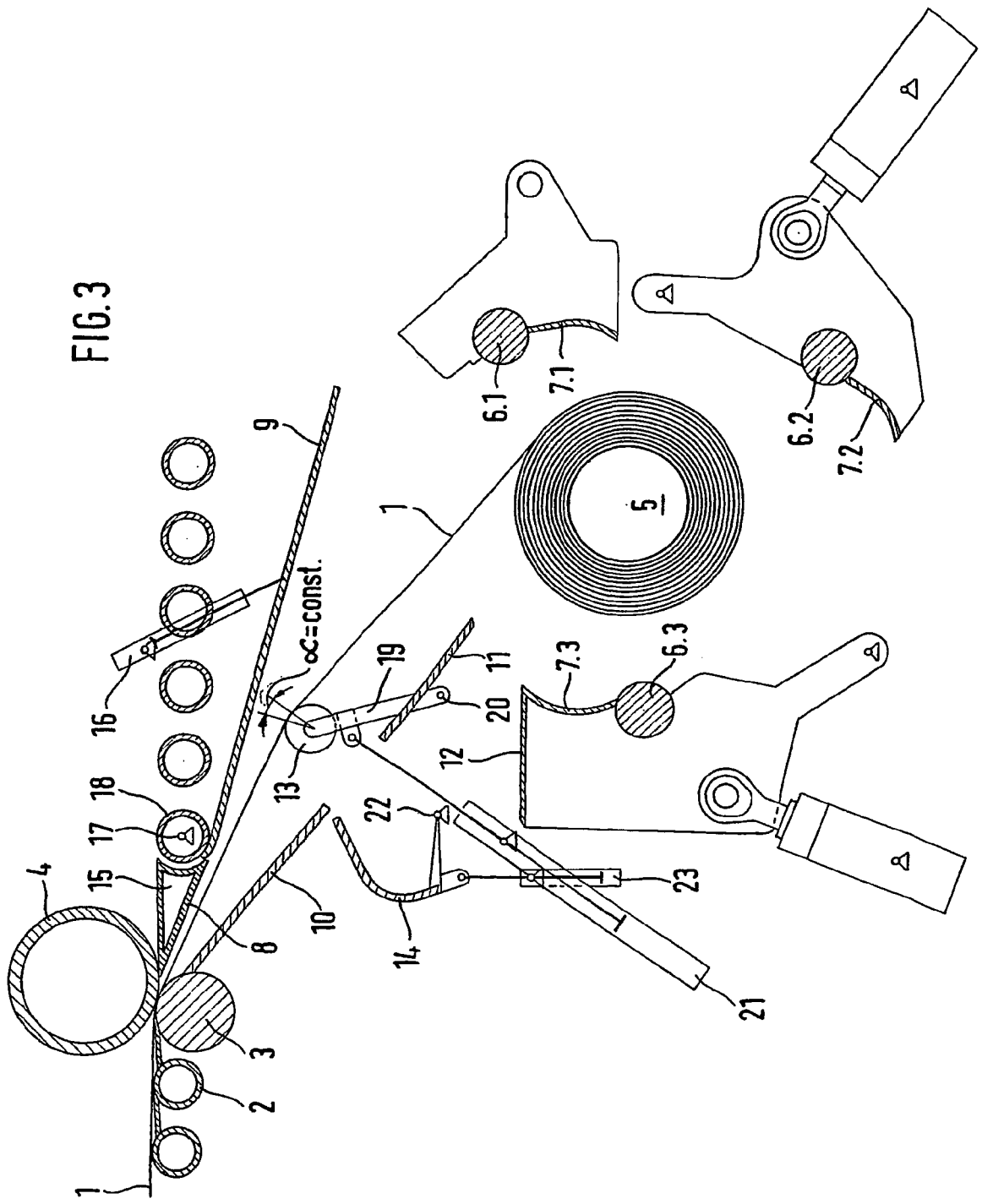
FIG. 3 shows a flatness measuring roll in a later measuring position during the winding of the coil.
Figure 4:
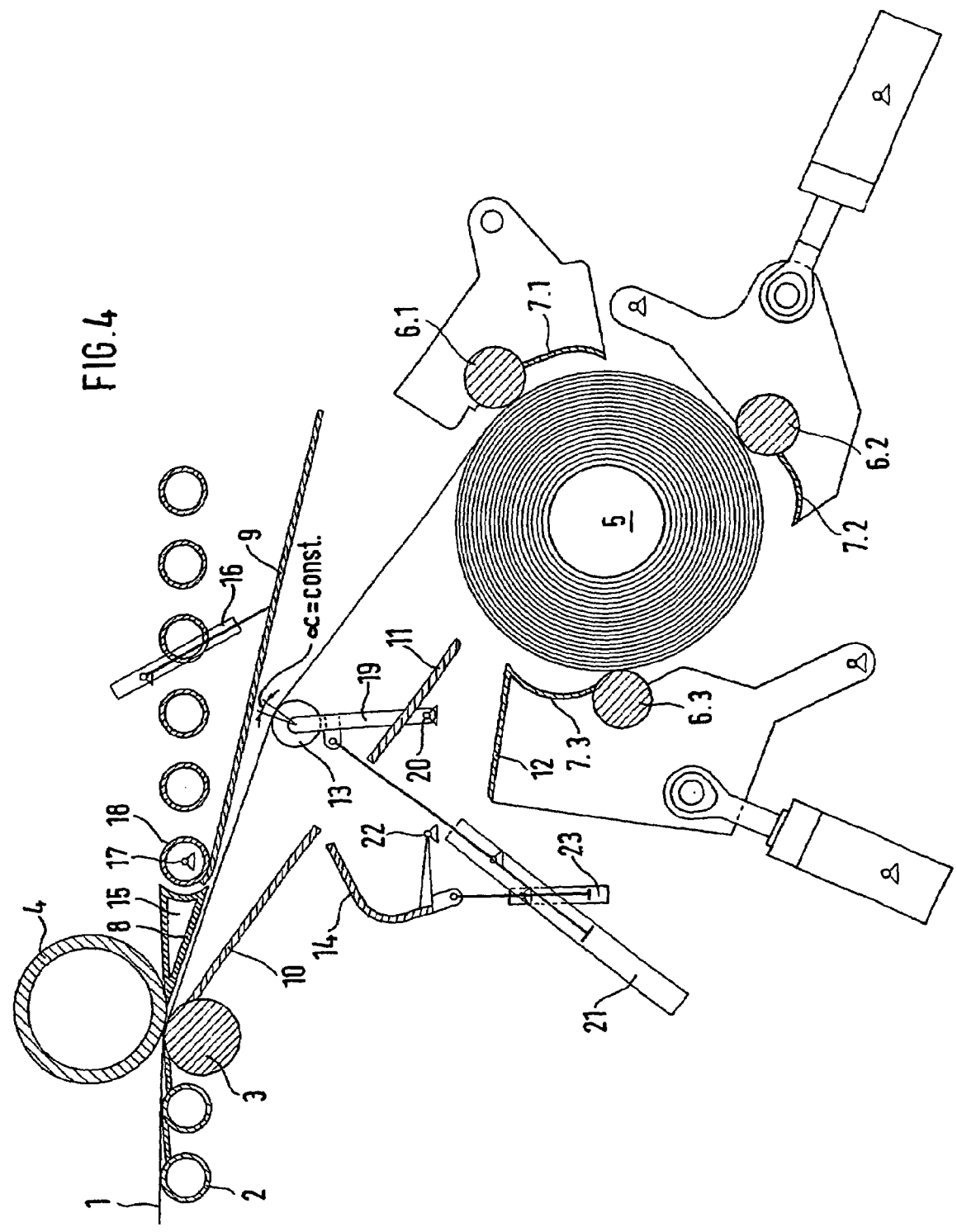
FIG. 4 shows a flatness measuring roll, still in the measuring position, just before the end of the coiling process.
Figure 5:
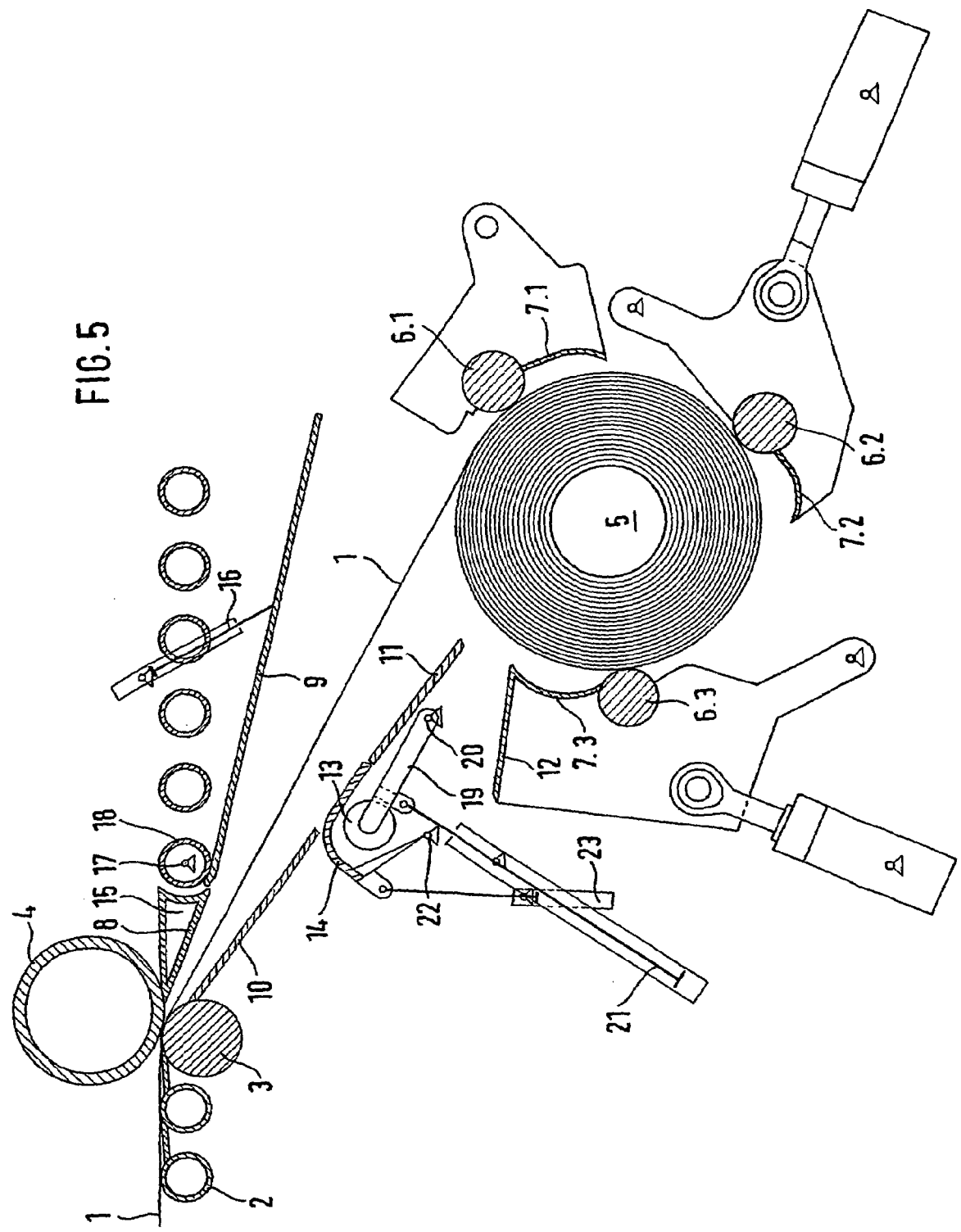
FIG. 5 shows a flatness measuring roll in the lowered position during the entrance of the strip.

After the start of coiling, the flatness measuring roll 13 is swiveled into its starting position (compare FIG. 2); this position is then continuously readjusted in correspondence with the increase in the diameter of the coil under preservation of a constant contact angle $\alpha$.

Shortly before the end of the coiling process, the flatness measuring roll 13 is lowered, and the strip guide 14, which also serves to protect the flatness measuring roll 13, is swiveled back into position.

Simultaneously with the lowering of the flatness measuring roll 13, the pressure rolls 6 are moved up to the coil to prevent the outer turns from expanding outward.

After the coil has been removed, the pressure rolls 6 and the deflecting shells 7 are swiveled back into the starting position according to FIG. 1, and the shaft flap 9 is lowered. It is now possible for a new strip to be coiled.

Another variant of the device is shown in FIGS. 6–9 and described below. A hot-rolled strip 1 is sent via a roller table 2 and the drive rolls 3, 4 of a driver to a coiler, which is equipped with a coiling mandrel 5, pressure rolls 6, and deflecting shells 7.

Strip guides 8, 9.1, 9.2, 10, 11, 12; a flatness measuring roll 13 with a swiveling strip guide 14; and a deflection roll 24 are installed between the driver the coiler.

The strip guide 8 is part of a strip distributing guide 15, which makes it possible to switch the beginning of the strip from one coiler to another in cases where multiple coilers are being used.

The strip guide 9.1, 9.2 represents the shaft flap 9.1, 9.2, which is actuated by means of, for example, two position-controlled hydraulic cylinders 16, 25, and which is pivotably supported at a center of rotation 17, which is shared in common by the strip distributing guide 15, the distributing guide roll 18, and the shaft flap 9.1, 9.2.

The deflecting roll 24 is supported rotatably on the shaft flap 9.1, which swivels around the center of rotation 17; after the beginning of the strip has arrived and the coiling operation has begun, the deflecting roll is lowered into position against stationary stops in a position-controlled manner. During this lowering movement of the deflecting roll 24, the separately swiveling part 9.2 of the shaft flap is simultaneously swiveled upward by means of the cylinder 25 around the center point 26 of the deflecting roll 24, so that the necessary space is created for the coil to be wound up.

Immediately after the coiling has begun, the flatness measuring roll 13, which is supported in a swivel frame 19, is swiveled around the center of rotation 20 by means of, for example, a position-controlled hydraulic cylinder 21 against two stationary stops and thus into the measuring position.

In this measuring position, the geometry of the traveling strip between the driver roll 3, the flatness measuring roll 13 with a constant contact angle $\alpha$, and the deflecting roll 24 remains constant throughout the entire coiling process.

The strip guide 14 is attached to the swiveling frame 19 of the flatness measuring roll 13 and is swiveled away automatically when the flatness measuring roll 13 is swung away.

Just before the end of the strip arrives, the shaft flap 9.1 is swiveled along with the deflecting roll 24 into the upper end position, while simultaneously the flap 9.2 is lowered; the flatness measuring roll 13 is moved into its lowered, protected position.

Figure 6:
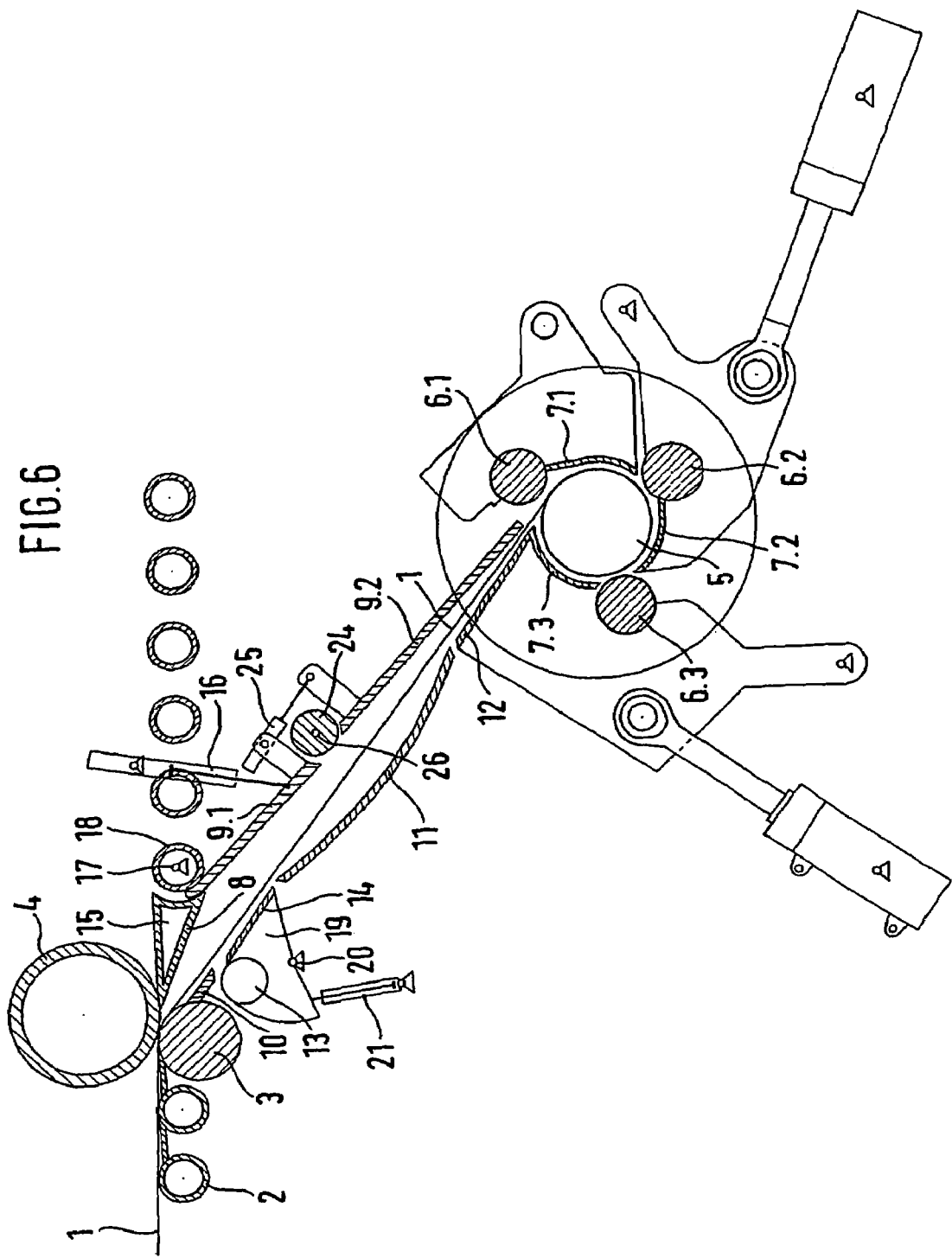
FIG. 6 shows a different arrangement with a flatness measuring roll and a deflection roll between the driver and the coiler during the infeed of the beginning of the strip.

After the coil has been removed, the pressure rolls 6 are swiveled along with the deflecting shells 7 back into the initial coiling position according to FIG. 6, and the shaft flap 9.1, 9.2 is also lowered along with the deflecting roll 24 into the initial coiling position according to FIG. 6. Then a new strip can be coiled.

The flatness measuring roll 13 and the deflecting roll 24 are equipped with rotary drives (not shown), both the speed and torque of which are automatically controlled, so that there are no relative velocities between the strip and the roll surface, and no scorings or material deposits are formed. This means that the flatness measurement can be begin as soon as contact with the strip has been established.

The invention claimed is:

1. Process for measuring and influencing the flatness of strip in the coiler shaft of a hot strip rolling mill, where the coiler shaft has movable and stationary strip guides between a driver and a coiler as well as a flatness measuring roll, which is moved from a working position, in which the hot strip is guided around the flatness measuring roll (13) under maintenance of a nearly constant contact angle $\alpha$, into a lowered position, and where the hot strip is sent by way of a roller table and the driver rolls of the driver through the coiler shaft to a coiler equipped with coiling mandrel, pressure rolls, and deflecting shells, wherein the flatness measuring roll (13) is protected in the coiler shaft by a strip guide (14), which can be swiveled into and out of position.

2. Device on a coiler shaft, which has between a driver and a coiler movable and stationary strip guides and a flatness measuring roll which can be moved from a working position, in which the hot strip can be guided around the flatness measuring roll (13) under maintenance of a nearly constant contact angle $\alpha$, into a lowered position, and where the hot strip is sent by way of a roller table and the drive rolls of the driver through the coiler shaft to the coiler, which is equipped with a coiler mandrel, pressure rolls, and deflecting shells, for implementing the process according to claim 1, wherein, in the coiler shaft, a strip guide (14) is provided, which protects the flatness measuring roll (13) and which can be swiveled into and out of position.

3. Device according to claim 2, wherein the flatness measuring roll (13) can be moved into the working position after the tensile stresses have been built up.

4. Device according to claim 2, wherein the flatness measuring roll (13) is attached to a swiveling frame (19), which is rotatably supported at a center of rotation (20).

5. Device according to claim 2, wherein the flatness measuring roll (13) can be moved around the center of rotation (20) into the working position by a hydraulic cylinder (21).

6. Device according to claim 2, wherein the flatness measuring roll (13) can be rotated by a drive.

7. Device according to claim 6, wherein both the rotational speed and the torque of the drive can be automatically controlled in a continuously variable manner.

8. Device according to claim 2, wherein the flatness measuring roll (13) and the strip guide (14) can be moved separately from each other around different centers of rotation (20, 22).

9. Device according to claim 2, wherein the flatness measuring roll (13) can be moved in a continuously variable manner as far as the stop on the cylinder (21) and can be repositioned to accommodate the changing height of the coil so that a nearly constant contact angle α can be maintained.

10. Device according to claim 2, wherein the strip guide (14) can be moved by the hydraulic cylinder (23) around the center of rotation (22).

11. Device according to claim 2, wherein the flatness measuring roll (13) and the strip guide (14) can be moved around a common center of rotation (20).

12. Device according to claim 11, wherein the flatness measuring roll (13) and the strip guide (14) can be mounted on a support frame (19).

13. Device according to claim 11, wherein the flatness measuring roll (13) can be swiveled into a stationary working position.

14. Device according to claim 11, wherein the position-controlled deflecting roll (24) can be introduced into the tension path of the hot strip (1) to maintain a nearly constant contact angle α around the flatness measuring roll (13).

15. Device according to claim 14, wherein the deflecting roll (24) can be rotated by a drive, the rotational speed and/or the torque of which can be controlled in a continuously variable manner.

* * * * *